(12) United States Patent
Duggal et al.

(10) Patent No.: US 10,044,973 B2
(45) Date of Patent: *Aug. 7, 2018

(54) METHOD AND APPARATUS FOR PROVIDING ENGAGING EXPERIENCE IN AN ASSET

(71) Applicant: Adobe Systems Incorporated, San Jose, CA (US)

(72) Inventors: Ashish Duggal, Ashok Nagar (IN); Sachin Soni, New Delhi (IN); Anmol Dhawan, Ghaziabad (IN); Vineet Sharma, Draper, UT (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 410 days.

This patent is subject to a terminal disclaimer.

(21) Appl. No.: 14/975,148

(22) Filed: Dec. 18, 2015

(65) Prior Publication Data
US 2016/0105633 A1    Apr. 14, 2016

Related U.S. Application Data

(63) Continuation of application No. 14/335,288, filed on Jul. 18, 2014, now Pat. No. 9,232,173.

(51) Int. Cl.
*H04N 5/93* (2006.01)
*H04N 5/91* (2006.01)

(52) U.S. Cl.
CPC ............... *H04N 5/93* (2013.01); *H04N 5/91* (2013.01)

(58) Field of Classification Search
CPC combination set(s) only.
See application file for complete search history.

(56) References Cited

U.S. PATENT DOCUMENTS

| | | | |
|---|---|---|---|
| 6,927,545 B2 * | 8/2005 | Belliveau | H05B 37/029 315/294 |
| 7,158,676 B1 * | 1/2007 | Rainsford | H04N 7/17318 348/700 |

(Continued)

OTHER PUBLICATIONS

Guang-Ho Cha, "Object-Based interactive Video Access for Consumer-Driven Advertising", EC-Web 2007, LNCS 4655, pp. 222-228, 2007.
U.S. Appl. No. 14/335,288, Sep. 1, 2015, Notice of Allowance.

*Primary Examiner* — Anand Bhatnagar
(74) *Attorney, Agent, or Firm* — Keller Jolley Preece

(57) ABSTRACT

In one embodiment, at least one of number of times a frame is paused by a plurality of users (users) and attention-activity of the users for the frame is tracked for each frame of an asset (video etc.). An interactive version of at least one frame is pre-generated based on the tracking. The interactive version is stored to enable playing of the interactive version of the at least one frame. In another embodiment, pausing of a currently playing frame (frame) of the asset is determined. A determination to replace the frame is made based on at least one of attention-activity of a user in the frame, and detecting metadata, of the frame, specifying that the frame is to be replaced. An interactive version of the frame is generated, based on at least one of the attention of the user and the metadata, to replace the frame with the interactive version.

20 Claims, 8 Drawing Sheets

(56) References Cited

U.S. PATENT DOCUMENTS

| | | | | |
|---|---|---|---|---|
| 8,020,099 | B1* | 9/2011 | Lu | H04N 21/4781 |
| | | | | 700/88 |
| 8,135,803 | B2* | 3/2012 | Whittaker | G06Q 30/0267 |
| | | | | 709/203 |
| 8,843,959 | B2* | 9/2014 | McMaster | H04N 7/17318 |
| | | | | 382/103 |
| 9,232,173 | B1* | 1/2016 | Duggal | H04N 5/91 |
| 2002/0055891 | A1* | 5/2002 | Yang | G06Q 30/02 |
| | | | | 705/27.2 |
| 2002/0063714 | A1* | 5/2002 | Haas | G06F 17/30017 |
| | | | | 345/473 |
| 2003/0103670 | A1* | 6/2003 | Schoelkopf | G06T 11/001 |
| | | | | 382/162 |
| 2004/0021684 | A1* | 2/2004 | Millner | H04N 21/23431 |
| | | | | 715/719 |
| 2004/0071453 | A1* | 4/2004 | Valderas | G11B 27/105 |
| | | | | 386/333 |
| 2004/0178750 | A1* | 9/2004 | Belliveau | H05B 37/029 |
| | | | | 315/294 |
| 2005/0104966 | A1* | 5/2005 | Schoelkopf | G06T 11/001 |
| | | | | 348/207.11 |
| 2008/0294694 | A1* | 11/2008 | Maghfourian | G06F 17/30855 |
| 2012/0200667 | A1* | 8/2012 | Gay | A63F 13/52 |
| | | | | 348/43 |
| 2013/0046637 | A1* | 2/2013 | Slutsky | G06Q 30/0269 |
| | | | | 705/14.66 |
| 2013/0251338 | A1* | 9/2013 | Abecassis | H04N 5/445 |
| | | | | 386/241 |

* cited by examiner

METHOD AND APPARATUS FOR PROVIDING ENGAGING EXPERIENCE IN AN ASSET

CROSS REFERENCE TO RELATED APPLICATIONS

The present application is a continuation of U.S. application Ser. No. 14/335,288 filed Jul. 18, 2014. The aforementioned application is hereby incorporated by reference in its entirety.

BACKGROUND

Often, it happens that while watching a video, a user is interested in exploring content displayed in a currently playing video frame. Currently, for exploring the content, the user pauses the video and varies zoom level of the video frame. However, varying the zoom level deteriorates visibility of the content and results in bad engaging experience for the user. Further, no additional information regarding the content is provided to the user. Lack of any further information is unfavorable when the user is also a prospective buyer of an object displayed in the currently playing video frame. Lack of any further information also results in a lost opportunity for a marketer or author of the video to engage the user and take user experience to next level. Therefore, there is a need for enhancing the video to deliver better engaging experience to the user.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A method for providing engaging experience in an asset (video, group of images, slideshow etc.) is provided. In one embodiment, for each frame of the asset, at least one of number of times a frame is paused by a plurality of users, and attention-activity of the plurality of users for the frame is tracked. An interactive version of at least one frame is pre-generated based on at least one of the number of times the at least one frame is paused, and the attention-activity for the at least one frame. The interactive version is then stored to enable playing of the interactive version of the at least one frame.

In another embodiment, a trigger indicative of an interruption in a currently playing frame of the asset is determined. A determination to replace currently playing frame is made based on at least one of determining attention of a user to the currently playing frame based on attention-activity of the user in the currently playing frame, and detecting metadata, of the currently playing frame, specifying that the currently playing frame is to be replaced. An interactive version of the currently playing frame is generated based on at least one of the attention of the user and the metadata. The currently playing frame is then replaced with the interactive version to play the interactive version.

In yet another embodiment, for each frame of the asset, at least one of number of times a frame is paused by a plurality of users, and attention-activity of the plurality of users for the frame is tracked. An interactive version of at least one frame is pre-generated based on at least one of the number of times the at least one frame is paused, and the attention-activity for the at least one frame. The asset having the interactive version of the at least one frame is then played.

An apparatus for substantially performing the method as described herein is also provided.

Figure 1:
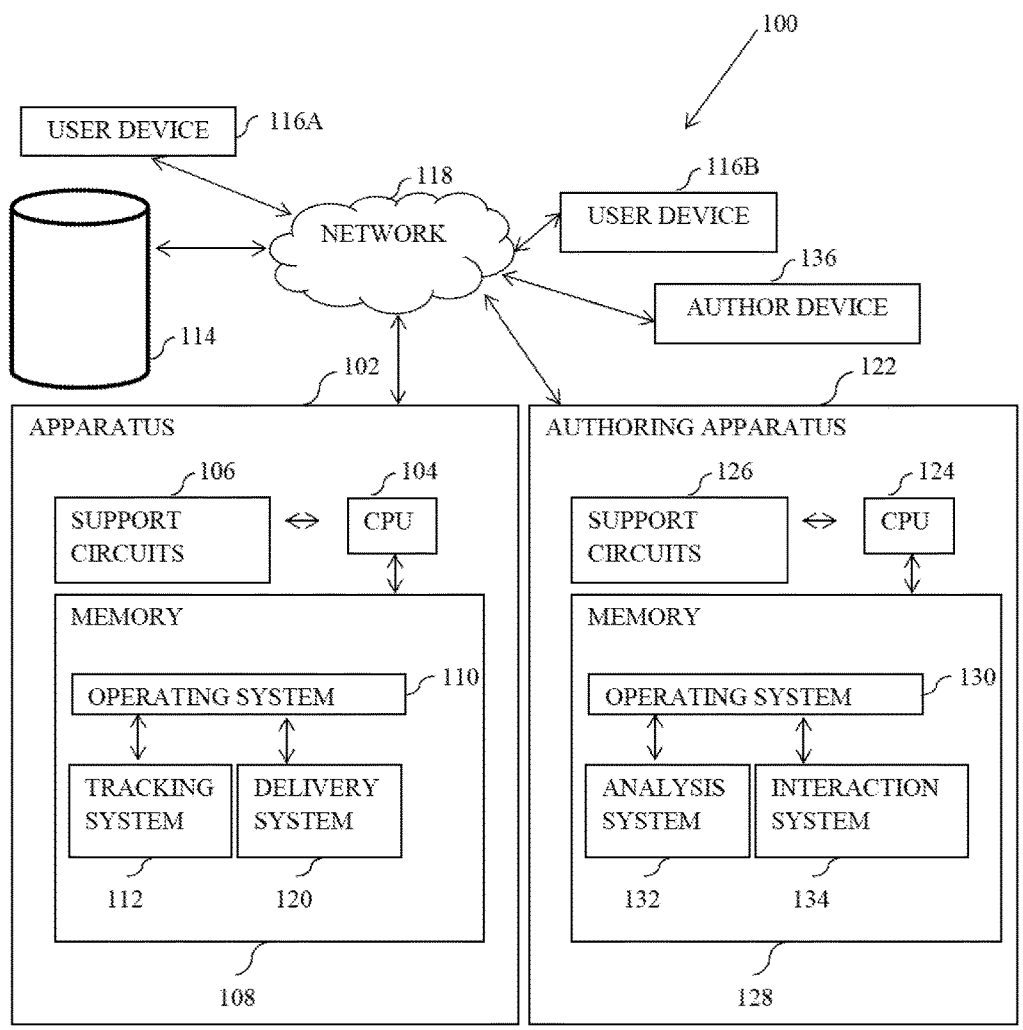
FIG. 1 is a diagram of an environment for providing engaging experience in an asset, according to one or more embodiments.

While the procedure and apparatus is described herein by way of example for several embodiments and illustrative drawings, those skilled in the art will recognize that the procedure and apparatus for providing engaging experience is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the procedure and apparatus for providing engaging experience. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Overview

One prior procedure for enhancing video and enhancing engaging experience of the user includes adding interactivity to objects displayed in a currently playing video frame. The video is pre-processed to segment the objects from the video and to add interactivity to the segmented objects. The user can obtain additional information, such as product's brand name, price, and website, by selecting the objects (clothes worn by an actor etc.) displayed in the currently playing video frame. However, creation and delivery of such a video (interactive video) is not at par. For example, the process of creating the interactive video is a hassle because each frame of the interactive video needs to be processed to identify the objects in that frame. Further, delivery of the interactive video burdens the resources (bandwidth etc.) and also, hampers the engaging experience of the user if a bandwidth required to play the interactive video is not available. In addition, it may happen that the user does not actually interact with the objects while watching the interactive video and hence, this leads to wastage of resources spent in delivering the interactive video. Therefore, there is an unmet need of enhancing engaging experience of the user in an optimized manner.

In accordance to embodiments of the present invention and as described in more detail below, a method for providing engaging experience in an asset (video, group of images, slideshow etc.) is provided. A first user, while watching an asset, pauses a currently playing frame and engages with content of the currently playing frame in various ways (by zooming into the content, panning the content, clicking over the content, mouse hovering over the content etc.). The attention-activity (such as engagement of the user in various ways) with the currently playing frame is tracked and stored along with a frame number of the currently playing frame. Attention-activities and pauses performed by multiple users are tracked and stored. The frames are scored based on the attention-activities or number of pauses or both. A report including frames with scores greater than a predefined threshold is provided to an author of the asset. The author then adds interactivity (annotations, hotspots, hyperlinks, data, overlays, call to action button etc.) to the frames having scores greater than the predefined threshold. The threshold is customizable and can be set by the author. In one example, a frame having maximum number of pauses has highest score. In another example, a frame having maximum number of "pauses+at least one attention-activity" has highest score. In yet another example, any other combination of pauses and attention-activity can be used to allot score to the frames. Any weighted average scoring algorithm can be used to perform the scoring. The author adds interactivity via an interface provided to the author. In one embodiment, the interface exposes editing tools to add interactivity to the frame and to pre-generate an interactive version of the frame. In another embodiment, the editing can be performed using any other tool and the interface exposes upload functionality to enable the author to upload the interactive version of the frame. The frame is then appended with some data to indicate that an interactive version of the frame is available. In one example, the appending (tagging etc.) is performed in the metadata of the frame. The metadata helps in providing the interactive version of the frame when required. In some embodiments, the metadata can be enhanced to include other parameters, such as a parameter indicating when to automatically provide the interactive version or a parameter specifying a rule after fulfillment of which the interactive version is to be provided etc.

In some embodiments, the interactivity is added automatically, i.e. without the author's inputs, to the frames having scores greater than the predefined threshold. Once the automatically pre-generated interactive version is available it can be provided to the author for review. The pre-generated interactive version is then stored for later access.

A second user, while watching the asset, then pauses the currently playing frame. In response to the pause, a check is performed to determine if the currently playing frame is to be replaced with the interactive version of the currently playing frame. The checking includes either detecting metadata specifying that a replacement is required or determining an attention-activity (zooming into the content, panning the content, clicking over the content, mouse hovering over the content etc.) of the second user with the currently playing frame. On meeting any one condition, i.e. either the condition based on metadata or the condition based on attention-activity or both, the interactive version of the currently playing frame is generated. The generation of the interactive version includes either fetching a pre-generated interactive version or adding a call to action button to the currently playing frame on the fly. The currently playing frame is then replaced with the interactive version to play the interactive version. The interactive version enhances engaging experience of the user in an optimized manner, i.e. without replacing each and every frame with the interactive version, and without replacing the frame with interactive version as a default.

Terms Definitions (In Addition to Plain and Dictionary Meaning of the Terms)

An asset is an electronic content that plays on an electronic system. The electronic content includes one or more frames with each frame being a video frame or an image or an audio frame. The electronic system includes one or more processors and includes a player (software application) for playing the electronic content. A user, typically, views or consumes or listens or plays the asset on the electronic system using the player. In one embodiment, the asset is a video and the user plays the video on a video player using the electronic system of the user. Examples of the asset include, but are not limited to, video, slideshow, audio, group of images, group of video frames, group of audio frames, group of pages etc. Examples of the electronic system includes, but are not limited to, a desktop computer, a smartphone, a tablet computer, a laptop computer, a mobile computer or any other electronic device having one or more processors.

A player is a software application installed on the electronic system for playing the asset. For example, a video player or video application is used for playing the video, an audio player or audio application is used for playing the audio, an image player or image application is used for playing the image or group of images or slideshow etc.

Currently playing frame is a frame of the asset that is currently being played or rendered by the electronic system. For example, a video frame displayed on the electronic system at a time instant "t" is the currently playing frame for the time instant "t". Similarly, in a group of images, an image displayed on the electronic system at a time instant "t" is the currently playing frame for the time instant "t". Similarly, in an audio, an audio frame playing on the electronic system at a time instant "t" is the currently playing frame for the time instant "t".

A user is an entity or a person that consumes or views or listens to the currently playing frame. A user also includes the entity or person who pauses the currently playing frame. The pausing is performed using the player application used for playing the asset.

Previous users are entities or persons who have consumed or viewed or listened to the currently playing frame in the past. Previous users also includes the users who have previously, in past, paused the currently playing frame while consuming the currently playing frame.

Attention-activity is an activity performed by the user while consuming the asset via the player. The attention-activity indicates attention of the user for the currently playing frame or a portion of the currently playing frame. For example, the user while watching a video may perform various activities like pausing the video followed by zooming into the currently playing frame or panning to a portion of the currently playing frame or gazing at a particular portion of the frame etc. All such activities are determined to be attention-activities. The attention-activities are tracked and are used to determine user interest or user attention in various frames of the asset. The attention-activity indicates engagement of the user with the asset. The attention-activity is used to score each frame of the asset and reports are generated based on the scores to indicate important frames of the asset to a marketer. Examples of the attention-activity include, but are not limited to, varying zoom level of the currently playing frame, panning to a portion of the currently playing frame, gazing at the portion of the currently playing frame, clicking at the portion of the currently playing frame, hovering mouse over the portion of the currently playing frame, and engaging with the portion of the currently playing frame in any other way. In one embodiment, attention-activity is inferred by the electronic system as the activity performed by the user.

Interactive version is a version of an asset with interactivity added to it and with which the user can engage. The interactivity is added, for example, by adding hotspots, hyperlinks, annotations, call to action button or by adding any other form of engagement to the currently playing frame of the asset. The interactive version provides information over and above the information included in the currently playing frame without interactivity. For example, the user can click on the hyperlink added to the frame and can visit a webpage providing more information about the content of the frame. In one embodiment, the interactive version is generated by adding interactivity or engagement option within the currently playing frame, and not as a separate thumbnail stream or as an overlay. In another embodiment, the interactive version is generated by adding interactivity or engagement option, not only to an object present in the frame but, to a portion in the frame. The portion can be larger than the object or smaller than the object. The interactive version can be generated in real time, i.e. while the asset is being consumed, or the interactive version can be pre-generated by marketer or author of the content. The interactive version is generated based on number of times the frame is paused by the users, one or more attention-activities of the users related to the frame, or both. For example, if there is a particular frame of a video that various users pause or zooms into then that may be the most liked frame and hence, the marketer may desire to turn that frame into interactive frame by generating or pre-generating the interactive version for that frame. An example of the interactive version is provided in FIG. 6C. FIG. 6C includes an interactive version 610 of a currently playing frame 606 (shown in FIG. 6B). The interactive version 610 includes a clickable spot 612 and, optionally, a message 614. Examples of the interactive version include, but are not limited to, video frame with a clickable spot within the video frame, an image with a clickable spot within the image etc.

A call to action button is a banner, button, or some type of graphic or text to prompt a user to click on it. The call to action button can also include hyperlinks.

A hotspot is an area of the currently playing frame which is hyperlinked or which includes any other form of interactivity that becomes visually distinct in response to various inputs. Examples of various inputs to make hotspot visually distinct includes, but are not limited to, mouse hover, gesture etc.

An author is an entity or a person who enables generation of the interactive version of currently playing frame. In one embodiment, the author includes a marketer who wants to add interactivity to marketing assets. For example, the marketer may want to provide more information, such as product details, product price etc., to the user. The information is provided by adding interactivity, such as clickable spots, to the marketing assets. The marketing assets are also referred to as assets herein.

In the following discussion, an example environment is first described that is operable to employ techniques described herein. Following this, a section entitled "Example Procedures" describes some example procedures for providing engaging experience in accordance with one or more embodiments. Finally, a section entitled "Example Snapshots" indicates providing engaging experience in accordance with one or more embodiments.

Example Environment

FIG. 1 is a diagram of an environment 100 for providing engaging experience in the asset, according to one or more embodiments. The environment 100 includes one or more user devices, such as a user device 116A and a user device 116B. The user devices can communicate with an apparatus 102 via a network 118. The environment 100 also includes one or more author devices, such as an author device 136. The author devices can communicate with an authoring apparatus 122 (hereinafter referred to as the apparatus 122) via the network 118. The environment 100 also includes a storage device 114 accessible via the network 118, or directly by the apparatus 102 or the apparatus 122.

Hardware Description

Examples of the user devices include, but are not limited to, a desktop computer, a smartphone, a tablet computer, a laptop computer, a mobile computer or any other electronic device having one or more processors.

Examples of the network 118 include, but are not limited to, internet, local area network (LAN), wireless area network, wired area network etc.

Examples of the apparatus 102 include, but are not limited to, a desktop computer, server, a combination of one or more servers, or any other electronic device having one or more processors. The apparatus 102 can be present at one single location or can be present at different locations in a distributed environment.

The apparatus 102 includes a Central Processing Unit (CPU) 104, support circuits 106, and a memory 108. The CPU 104 may include one or more commercially available microprocessors or microcontrollers that facilitate data processing and storage. The various support circuits 106 facilitate the operation of the CPU 104 and include one or more clock circuits, power supplies, cache, input/output circuits, and the like. The memory 108 may include at least one of Read Only Memory (ROM), Random Access Memory (RAM), disk drive storage, optical storage, removable storage or the like. The memory 108 includes an operating system 110, a tracking system 112, and a delivery system 120. The operating system 110 may include various commercially known operating systems.

The apparatus 102 may further include one or more input devices (not shown in FIG. 1) connected to the apparatus 102. Examples of the one or more input devices include, but are not limited to, peripheral devices, keyboard, mouse etc. In some embodiments, the apparatus 102 may not be connected to the input devices separately and may have functionalities of these input devices built into the apparatus 102, such as in cases in which the apparatus 102 is touch enabled device, gesture enabled device, or paired to such similar devices that act as the input devices.

The storage device 114 is, for example, a storage drive or a storage system, or a distributed or shared storage system.

Examples of the author devices include, but are not limited to, a desktop computer, a smartphone, a tablet computer, a laptop computer, a mobile computer or any other electronic device having one or more processors.

Examples of the apparatus 122 include, but are not limited to, a desktop computer, server, a combination of one or more servers, or any other electronic device having one or more processors. The apparatus 122 can be present at one single location or can be present at different locations in a distributed environment.

The apparatus 122 includes a Central Processing Unit (CPU) 124, support circuits 126, and a memory 128. The CPU 104 may include one or more commercially available microprocessors or microcontrollers that facilitate data processing and storage. The various support circuits 126 facilitate the operation of the CPU 124 and include one or more clock circuits, power supplies, cache, input/output circuits, and the like. The memory 128 may include at least one of Read Only Memory (ROM), Random Access Memory (RAM), disk drive storage, optical storage, removable storage or the like. The memory 128 includes an operating system 130, an analysis system 132, and an interaction system 134. The operating system 130 may include various commercially known operating systems.

In some embodiments, the operating system 130 also includes an editing system (not shown in FIG. 1).

The apparatus 122 may further include one or more input devices (not shown in FIG. 1) connected to the apparatus 122. Examples of the one or more input devices include, but are not limited to, peripheral devices, keyboard, mouse etc. In some embodiments, the apparatus 122 may not be connected to the input devices separately and may have functionalities of these input devices built into the apparatus 122, such as in cases in which the apparatus 122 is touch enabled device, gesture enabled device, or paired to such similar devices that act as the input devices.

In some embodiments, the apparatus 102 and the apparatus 122 are combined to form one single apparatus, i.e. the apparatus 102 includes the apparatus 122 and vice versa.

Functional Description

The functional working of the environment 100 is now explained using an example in which the asset is a video. In illustrated example, the user device 116A corresponds to a first user. The first user accesses a website XYZ and plays the video present on the website. While viewing the video the first user pauses a currently playing frame of the video. The pausing is tracked, by the user device 116A or the apparatus 102 (the tracking system 112), and is stored in the storage device 114 along with the frame number of the currently playing frame. The first user may pause different frames of the video multiple times, and all such pauses are tracked and stored. The apparatus 102 tracks and stores pauses performed by multiple users for the video. A database indicating the most paused frames in the video is created and stored in the storage device by the apparatus 102.

In some embodiment, the first user engages with content of the currently playing frame in various ways, such as zooming into the content, panning the content, clicking over the content, mouse hovering over the content etc. The attention-activity (such as engagement of the user in various ways) with the currently playing frame is also tracked and stored. Similarly, attention-activities performed by multiple users are tracked and stored.

An author of the website XYZ can access the stored data using the author device 136. The author has a subscription to a service provided by the apparatus 122. The service enables the author to create the video or the website or both, and to manage them. The managing includes performing one or more functionalities, such as hosting, creating, editing, deleting etc. The author logs into a portal provided by the apparatus 122 and visits the stored data. The stored data is analyzed and various reports are generated, for displaying to the author, by the analysis system 132. The reports are managed by the interaction system 134. One report indicates frames with various numbers of pauses. Another report indicates frames against time spent on each frame. Many other reports are available to the author via the portal. Based on various parameters (number of pauses, number of mouse hover, most time spent etc.), each frame is scored. Based on the reports (or score), the author decides to add interactivity to various frames of the video to pre-generate interactive versions of the frames. For example, the author may query the portal to provide the frames having scores greater than a certain threshold or the frames with certain number of pauses etc. The frames are edited using the editing system of the apparatus 122 or using any other editing tools. The editing system (part of the interaction system 134) provides an interface to enable editing of the frames. Examples of editing operation includes, adding hotspots, adding hyperlinks, adding call to action button etc. The edited frames are then automatically or manually uploaded to the storage device 114 by the apparatus 122. The interaction system 134 also provides functionalities other than editing and uploading to the author. For example, in some embodiments, the interaction system 134 can automatically add hotspots to the frames based on their scores. The frames having scores greater than a predefined threshold can be used for automatic addition of hotspots and hence, pre-generation of interactive versions. The predefined threshold is customizable by the author. The pre-generated interactive versions of the frames are stored in the storage device 114 against frame numbers of respective frames. Metadata of a frame, for which interactive version is available, is enhanced to indicate that the interactive version is available. The metadata is enhanced by adding tags or by any other way of marking the availability of the interactive version. In some embodiments, even though an interactive version may not be pre-generated, a marking can be done by the author in the metadata to indicate that the interactive version is to be generated in real time, i.e. during consumption of the video, by adding a default call to action button based on some rule. Various options of setting rules to enable generation of interactive version can be provided by the interaction system 134. For example, one rule can indicate that if a user pauses the frame and a time "p" seconds elapses then generate the interactive version by adding the call to action button. Various author-determined-adaptive-variation of the frame is indicated in the metadata and stored.

The apparatus 122 can provide the portal via a cloud service, for example Marketing Cloud, or can provide the functionalities via other means such as Adobe Experience Manager.

A second user then accesses the same website XYZ and plays the video present on the website using the user device 116B. The user device 116B corresponds to the second user. The second user pauses the currently playing frame. The pausing is detected as a trigger indicative of interruption of the currently playing frame by the tracking system 112. The tracking system 112 communicates to the delivery system 120 that the trigger is detected. The delivery system 120 then performs a check to determine whether the currently playing frame is to be replaced with an interactive version or not.

In one embodiment, the delivery system 120 fetches the metadata for the currently playing frame and determines if the metadata specifies that the currently playing frame is to be replaced with the interactive version. The delivery system 120 searches for tags or rules or both in the metadata. In case any tag or rule specifying the replacement is identified then it is determined that the currently playing frame is to be replaced with the interactive version. The metadata indicates author-determined-adaptive-variation of the frame.

In another embodiment, the second user also performs some attention-activity after pausing the currently playing frame. The attention-activity is tracked by the tracking system 112 and provided to the delivery system 120. The attention-activity indicates attention of the second user to the currently playing frame. If the attention-activity is detected then it is determined that the currently playing frame is to be replaced with the interactive version.

The delivery system 120 then generates the interactive version based on at least one of the attention-activity or the metadata. In one scenario, if the metadata indicates that a pre-generated interactive version is available for the currently playing frame then the delivery system 120 fetches the pre-generated interactive version from the storage device 114. In another scenario, if the metadata specifies the rule, that after pausing if the second user does nothing for "p" seconds then add a default call to action button to the currently playing frame to generate the interactive version, then the delivery system 120 does so. In yet another scenario, if any attention-activity is detected for the currently playing frame or a portion of the currently playing frame then the delivery system 120 adds a call to action button to that portion to generate the interactive version. In still another scenario, if the attention-activity is detected for the currently playing frame or a portion of the currently playing frame and there is a pre-generated interactive version for the portion then the delivery system 120 fetches the pre-generated interactive version.

The delivery system 120 then causes to replace the currently playing frame on the user device 116B by the interactive version to play the interactive version. In one embodiment, the delivery system 120 sends the interactive version to the user device 116B and the interactive version is rendered by replacing the currently playing frame. The replacement happens in real time, i.e. with minimal time delay, and does not affect user experience. The second user then engages with the interactive version. The interactive version provides a richer engaging experience to the second user in an optimized manner. The second user can obtain more information, such as product's brand name, price, and website, by interacting with the interactive version. The author or the marketer also benefits as the marketer is able to provide the interactive version to the second user for the frames for which the interactive version is most desired based on attention-activity data obtained from previous users.

The pausing and attention-activity of the second user is also tracked by the tracking system 112 to enhance the stored attention-activity data and the pause data in the storage device 114 for the currently playing frame and the video.

In some embodiments, the apparatus 102 and the apparatus 122 can be one single system. The functionalities of both the apparatus 102 and the apparatus 122 can be performed by any one apparatus including the tracking system 112, the delivery system 120, the analysis system 132 and the interaction system 134.

In some embodiments, the interaction system 134 also provides an option to the author to specify replacement of the currently playing frame with a high quality or high resolution version of the currently playing frame. If the author chooses such an option then the metadata of the currently playing frame is enhanced to indicate so. The delivery system 120 then causes to replace the currently playing frame with the high quality or high resolution version in response to the second user pausing the currently playing frame. Alternatively, the logic of replacement can be built in a player of the user device 116B causing the user device 116B to ask the apparatus 102 for the replacement. The replacement is done is such a way that it ensures the overall bandwidth for playing the asset remains the same. For example, the resolution (encoding) of remaining frames of the asset is reduced to achieve similar overall bandwidth. This result in enhancing the experience of the user, i.e. smooth playback, while viewing frames having high score as quality of such frames is high and at the same time no load is put on the bandwidth. Such replacement can be performed as part of pre-generation or on the fly, i.e. while the asset is played.

In some embodiments, the delivery system 120 is aware of all video frames that have corresponding interactive versions. The awareness regarding availability of interactive versions is present in the metadata. The delivery system 120, in conjunction with the tracking system 112, determines the bandwidth of the user device 116B. Based on the bandwidth and number of frames having interactive versions, the frames are encoded to provide high resolution for the frames having interactive versions. Also, based on the bandwidth, the video quality is adapted to ensure smooth playback. A scale down factor for encoding a frame for which interactive version is not present is defined as "detected bandwidth multiplied by number of frames without interactive version" divided by "bandwidth required for smooth playback of the video multiplied by total number of frames of the video". For example, if detected bandwidth of connection is 512 Kbps, the number of frames without interactive version is 197, bandwidth required for smooth playback of video is 1 Mbps, and total number of frames in the video is 200 then the scale down factor is (512 kbps*197)/(1 Mbps*200) =0.4925. Therefore, if the encoding parameter is X for the entire video then the non-interactive frames are encoded with 0.4925X to allow encoding of the frames with interactive versions with high quality.

In some embodiments, the frames having interactive versions are replaced with the respective interactive versions and the asset having the interactive versions is stored. Such asset is then provided to the user device 116B instead of replacing the frame with interactive version in real time. In such scenarios, the bandwidth is saved by encoding the asset appropriately, i.e. higher encoding for the frame with interactive version and lower encoding for the frame without interactive version. Overall encoding of the asset requires the same bandwidth (or with an acceptable or minimal level of variation) as it would have if there was no interactive version for any of the frames.

In some embodiments, some steps of the apparatus 102 and the apparatus 122 can be performed by the user device 116A and the user device 116B. For example, the tracking of the trigger can be performed at the user device 116A or at the user device 116B, and a message indicating the trigger can be sent to the apparatus 102. Similarly, other steps like replacement can be performed at the user devices after receiving the interactive version from the apparatus 102. The metadata detection or determination of attention-activity can also be performed at the user device 116B and in response to the detection a request can be sent to the apparatus 102 to send the interactive version.

The algorithms and procedures for performing various operations of the apparatus 102 and the apparatus 122 are now explained in conjunction with example procedures.

Example Procedures

Figure 2:
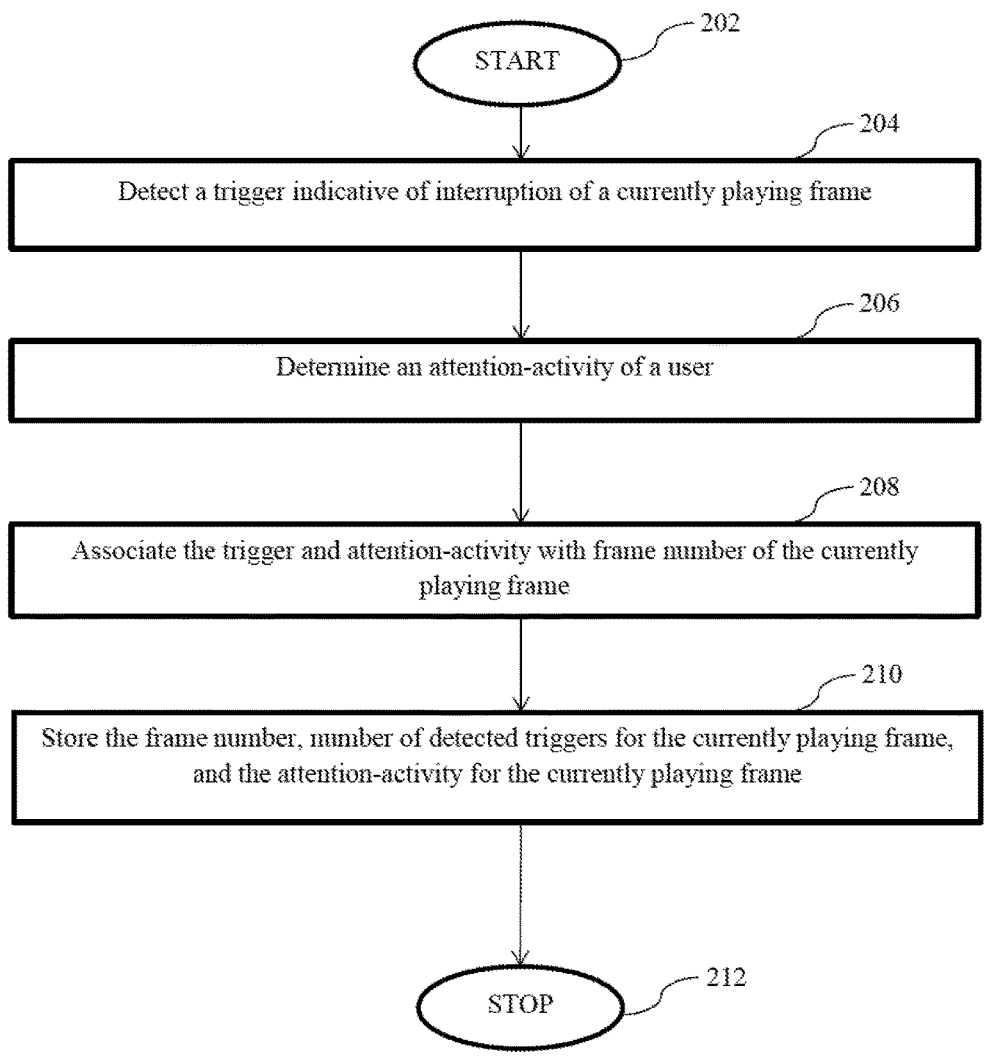
FIG. 2 is a flowchart of a procedure for tracking at least one of number of pauses and one or more attention-activities of one or more users, according to one or more embodiments.

FIG. 2 is a flowchart of a procedure 200 for tracking number of pauses and one or more attention-activities of one or more users by an electronic device or electronic system, for example the apparatus 102 or a combination of the users' devices and the apparatus 102, of FIG. 1 according to one or more embodiments.

The procedure starts at step 202 and proceeds to step 204.

At step 204, a trigger indicative of an interruption of the currently playing frame is detected. For example, a user may pause the currently playing frame and the pause is detected as the trigger indicating the interruption. The detection can be performed by, for example, the user device 116A or the apparatus 102 or both.

At step 206, one or more attention-activities of the user is determined. The user pauses the frame and then engages with the frame in number of ways. Examples of the various ways include, but are not limited to, varying zoom level of the currently playing frame, panning to a portion of the currently playing frame, gazing at the portion of the currently playing frame, clicking at the portion of the currently playing frame, hovering mouse over the portion of the currently playing frame, and engaging with the portion of the currently playing frame in any other way. Various technologies can be used for tracking the various ways in which the user engages with the frame.

At step 208, the trigger and the one or more attention-activities are associated with a frame number of the currently playing frame. The frame number uniquely identifies each frame in the asset. The frame number can be sent by the user device 116A to the apparatus 102 or the apparatus 102 can keep track of the frame number.

At step 210, the frame number, the trigger, and the one or more attention-activities are stored. In one embodiment, the count of the number of times trigger is detected and count of the number of times each attention-activity is determined is stored. Every time such a detection or determination occurs then the count of respective trigger or attention-activity is incremented. For example, it may happen that a user only pauses the currently playing frame and does not perform any attention-activity. In such a scenario, a customizable option can be provided to either include such counts or ignore such counts. The detection or determination or both is performed for various users and the count is stored for each frame.

The procedure stops at step 212.

Figure 3:
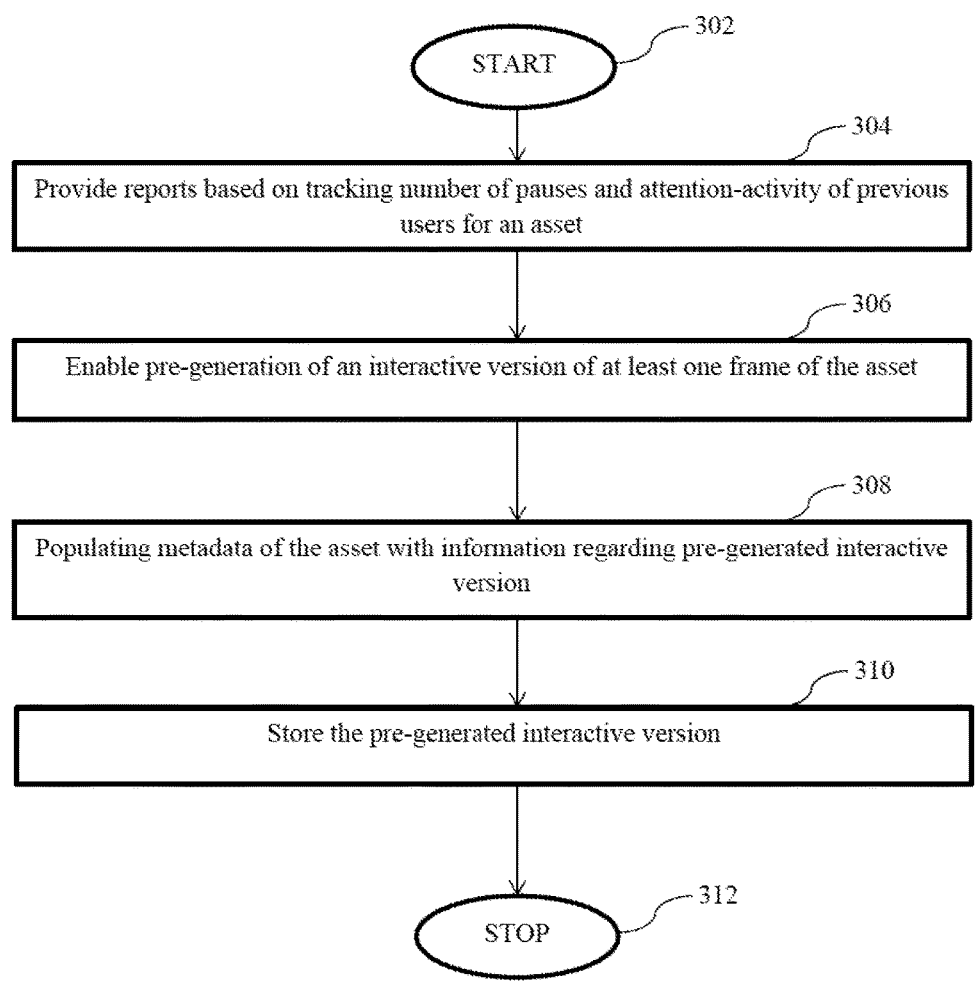
FIG. 3 is a flowchart of a procedure for pre-generating interactive version of a frame, according to one or more embodiments.

FIG. 3 is a flowchart of a procedure for pre-generating interactive version of a frame, according to one or more embodiments.

The procedure starts at step 302 and proceeds to step 304.

At step 304, various reports, based on tracking number of pauses and one or more attention-activities of previous users, are generated and provided to the author. The reports are provided via a portal to which the author has a subscription. Various examples of reports include a report indicating number of pauses vs. frame numbers of the asset, a report indicating number of users who performed a particular attention-activity vs. frame numbers of the asset etc. In some embodiments, each frame is scored based on the count of the number of pauses or number of attention-activities or both.

A report including scores vs. frame numbers of the asset is then generated. Such report can be further filtered to indicate the frames having scores greater than the pre-defined (author customizable) threshold.

At step 306, pre-generation of interactive version of a frame is enabled. In one embodiment, the portal also provides editing capabilities and the interactive version is pre-generated using such editing capabilities. The asset is loaded via the portal and based on the reports the author may decide to create (i.e. enable pre-generation of) the interactive version of one or more frames using the editing capabilities. For example, in one scenario the author may decide to pre-generate the interactive version for each frame having a minimum number of pauses. In another scenario, the author may decide to pre-generate the interactive version for each frame having a minimum number of attention-activities. In yet another scenario, the author may decide to pre-generate the interactive version for each frame having a minimum number of pauses and having a minimum number of attention-activities. Any other parameter can be used by the author to determine frames for which respective interactive versions need to be pre-generated. The interactive version is then uploaded on the portal. The pre-generation includes receiving one or more inputs from the author and then performing edits (additions etc.) in response to the inputs from the author. The editing includes adding one or more clickable spots within the frame to pre-generate the interactive version based on at least one of the number of pauses and one or more attention-activities.

In another embodiment, the editing can be performed separately, i.e. outside the scope of the portal, and the uploading is performed on the portal.

In yet another embodiment, the author can specify the predefined threshold and all frames having scores greater than the predefined threshold are automatically (i.e. without any additional input from the author) processed to pre-generate respective interactive versions. The interactive versions are then automatically accessible via the portal. An optional preview can be provided to the author and the author can at any point of time override the auto pre-generation to perform the edits using author inputs.

In some embodiments, the author can determine based on reports or without it to enable pre-generation of the interactive versions for certain frames.

At step 308, metadata of the asset or the frame is populated with information regarding the interactive version. Against each frame number information indicating availability of an interactive version can be marked. Any other form of tagging or storing information regarding availability of an interactive version can be used. Various options can be provided to the author to add rules for enabling playing of the interactive version on a user's device. For example, an option can be provided to the author via the portal to specify a default lapse time against the frames with the interactive versions. While consumption of the asset, if the user pauses the frame and a time equivalent or greater than the default lapse time passes by while in pause mode then the interactive version can automatically be provided to the user's device. Different lapse times can be set for different frames. All such information is stored in the metadata of the asset.

At step 310, the pre-generated interactive version is stored. The metadata and the asset are also stored. The pre-generated version is retrievable using the information stored in the metadata.

The procedure stops at step 312.

Figure 4:
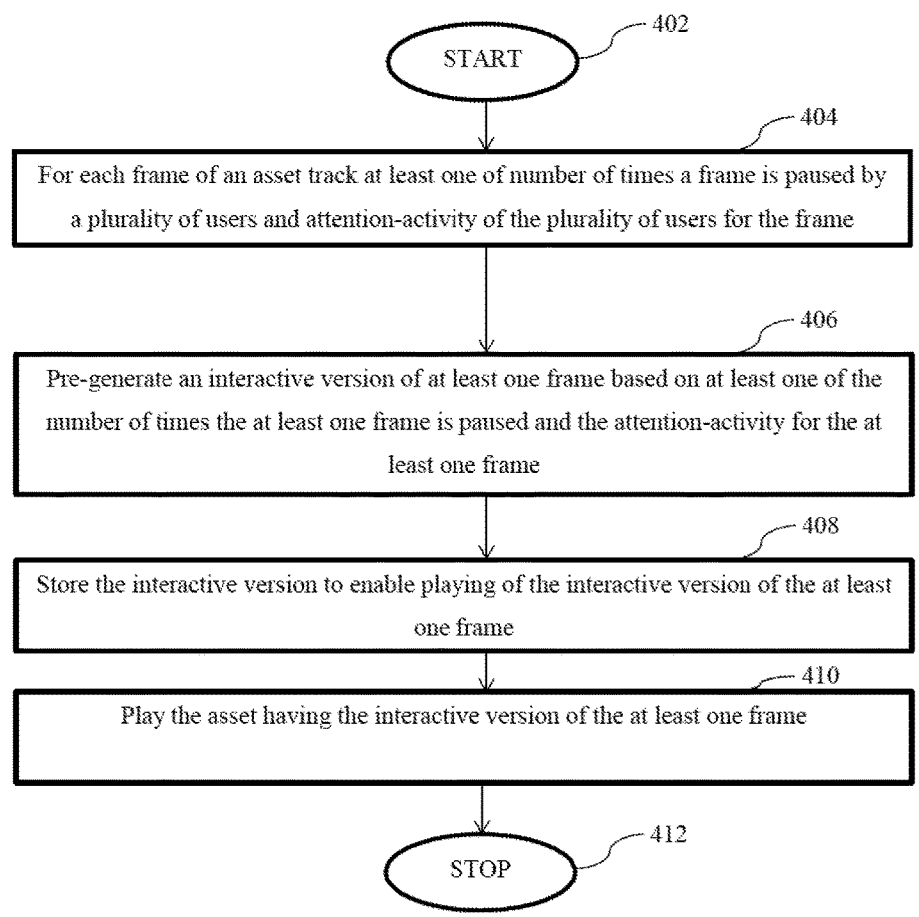
FIG. 4 is a flowchart of a procedure for providing engaging experience to a user, according to one or more embodiments.

FIG. 4 is a flowchart of a procedure for providing engaging experience to a user, according to one or more embodiments.

The procedure starts at step 402 and proceeds to step 404.

At step 404, for each frame of the asset, tracking of at least one of number of times a frame is paused by a plurality of users and one or more attention-activities of the plurality of users for the frame is performed. The tracking is performed as detailed in FIG. 2.

At step 406, an interactive version of at least one frame, based on at least one of the number of times the at least one frame is paused and the attention-activity for the at least one frame, is pre-generated. The pre-generation for the asset is performed as detailed in FIG. 3.

At step 408, the interactive version is stored to enable playing of the interactive version of the at least one frame. The storing is performed as detailed in FIG. 3.

The procedure further includes providing the asset to a user after the storing is performed. The pausing of the asset, by the user, is tracked and an input indicating the pause is received.

At step 410, the asset having the interactive version of the currently playing frame is played, i.e. displayed or rendered. The procedure enables or causes the interactive version of the currently playing frame to be played or provided to the user in response to the pausing. Optionally, determination of attention-activity of the user is also performed to enable playing of the interactive version.

In some embodiments, the frames having interactive versions are replaced with the respective interactive versions and the asset having the interactive versions is stored. Such asset is then provided to the user device 116B instead of replacing the frame with interactive version in real time. In such scenarios, the bandwidth is saved by encoding the asset appropriately, i.e. higher encoding for the frame with interactive version and lower encoding for the frame without interactive version. Overall encoding of the asset requires the same bandwidth as it would have if there was no interactive version for any of the frames The procedure stops at step 412.

Figure 5:
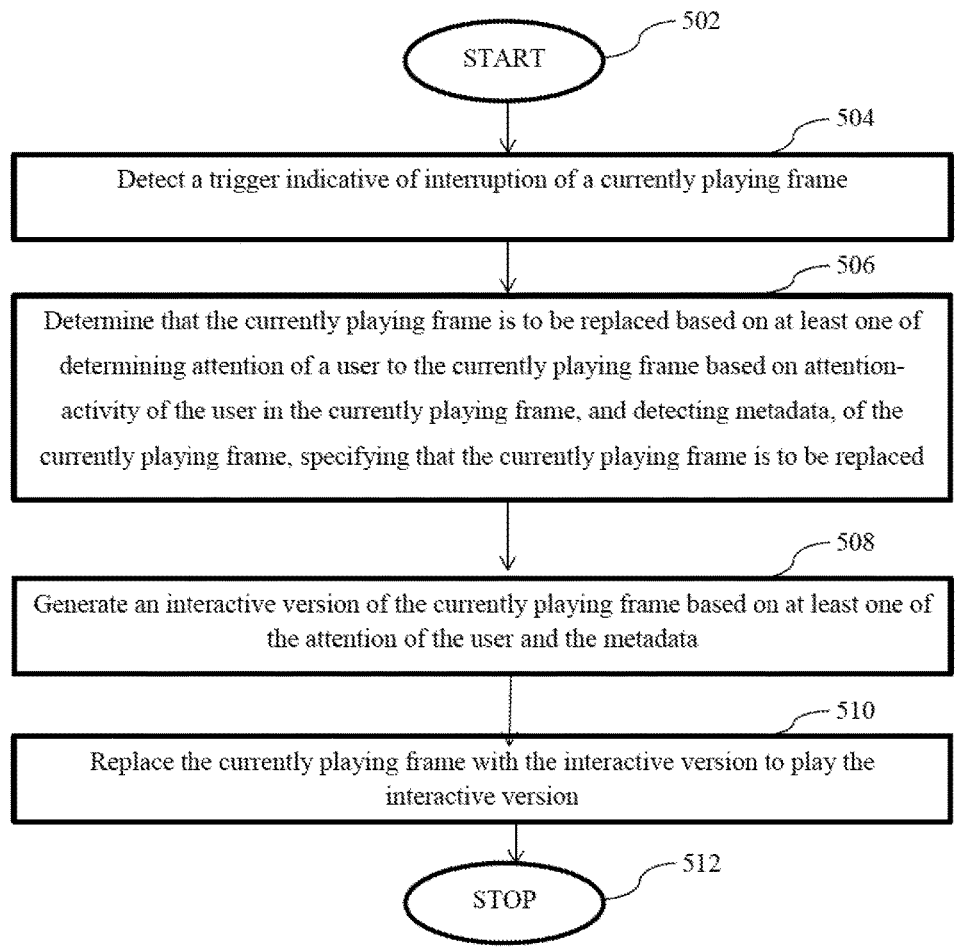
FIG. 5 is a flowchart of a procedure for providing engaging experience to a user based on at least one of attention-activity of a user and metadata of the asset, according to one or more embodiments.

FIG. 5 is a flowchart of a procedure for providing engaging experience to a user based on at least one of attention-activity of a user and metadata of the asset, according to one or more embodiments.

The procedure starts at step 502 and proceeds to step 504.

At step 504, a trigger indicative of an interruption of a currently playing frame is detected. For example, a user may pause the currently playing frame and the pause is detected as the trigger indicating the interruption. The detection can be performed by, for example, the user device 116A or the apparatus 102 or both, in conjunction.

At step 506, a determination that the currently playing frame is to be replaced is made. The determination is based on at least one of determining attention of a user to the currently playing frame based on attention-activity of the user in the currently playing frame, and detecting metadata, of the currently playing frame, specifying that the currently playing frame is to be replaced. The determination can be performed by, for example, the user device 116A or the apparatus 102 or both, in conjunction.

In one embodiment, in response to the user pausing the currently playing frame a check is performed in the metadata to determine if the currently playing frame is to be replaced. The check includes determining if the metadata specifies availability of an interactive version of the currently playing frame or a rule such as display the interactive version after a time "t" lapses post pausing the currently playing frame. If any such indication is present in the metadata then it is determined that the currently playing frame is to be replaced. The metadata is indicative of author-specified parameters.

In another embodiment, the attention-activity of the user is tracked to determine attention of the user to a portion of the currently playing frame or to the entire frame. For example, the user pauses the frame and then engages with the frame in number of ways. Examples of the various ways include, but are not limited to, varying zoom level of the currently playing frame, panning to a portion of the currently playing frame, gazing at the portion of the currently playing frame, clicking at the portion of the currently playing frame, hovering mouse over the portion of the currently playing frame, and engaging with the portion of the currently playing frame in any other way. Various technologies can be used for tracking the various ways in which the user engages with the frame. The engagement with the portion of the currently playing frame or with the entire frame indicates attention of the user to that portion or to the entire frame.

In yet another embodiment, the determination for replacing the currently playing frame is made based on both the metadata and the attention-activity of the user.

At step 508, the interactive version of the currently playing frame is generated based on at least one of the attention of the user and the metadata. The generation can be performed by, for example, the user device 116A or the apparatus 102 or both, in conjunction.

In one embodiment, the generation includes retrieving or fetching a pre-generated interactive version of the currently playing frame. The pre-generation is performed as detailed in FIG. 3.

In another embodiment, the generation includes adding a call to action button to the currently playing frame or the portion of the currently playing frame. The call to action can be a default clickable link provided by the author.

The user attention-activity is tracked and based on that the call to action button is added to the portion where user attention is present.

At step 510, the currently playing frame is replaced with the interactive version to cause or enable playing of the interactive version. The causing of replacement can be performed by, for example, the user device 116A or the apparatus 102 or both, in conjunction.

In various embodiments, step 508 and step 510 are performed in real time, i.e. with minimal time delay, to enhance user experience. Various steps as mentioned in FIG. 5 can be performed by the user device 116B or the apparatus 102 or both in combination. A combination of the apparatus 102 and the apparatus 122 can also be used in conjunction with user devices to perform steps of FIG. 5.

In some embodiments, as soon as user pauses the currently playing frame, a high quality, i.e. high resolution, frame is also fetched and the currently playing frame is replaced with the fetched frame to provide same content but in high quality.

Example Snapshots

Figure 6A:
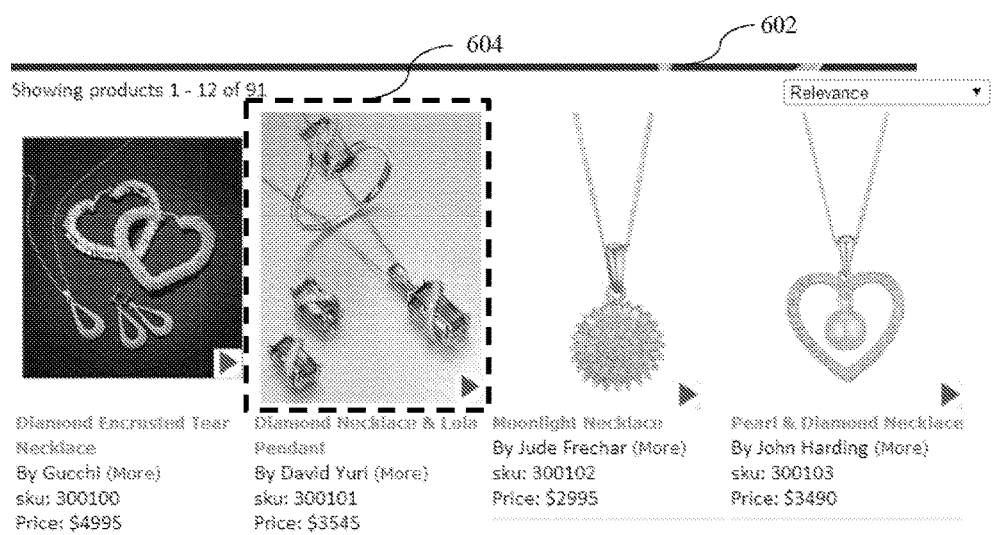
FIG. 6A, FIG. 6B, and FIG. 6C are diagrams illustrating engaging experience of a user, according to one or more embodiments.
Figure 6B:
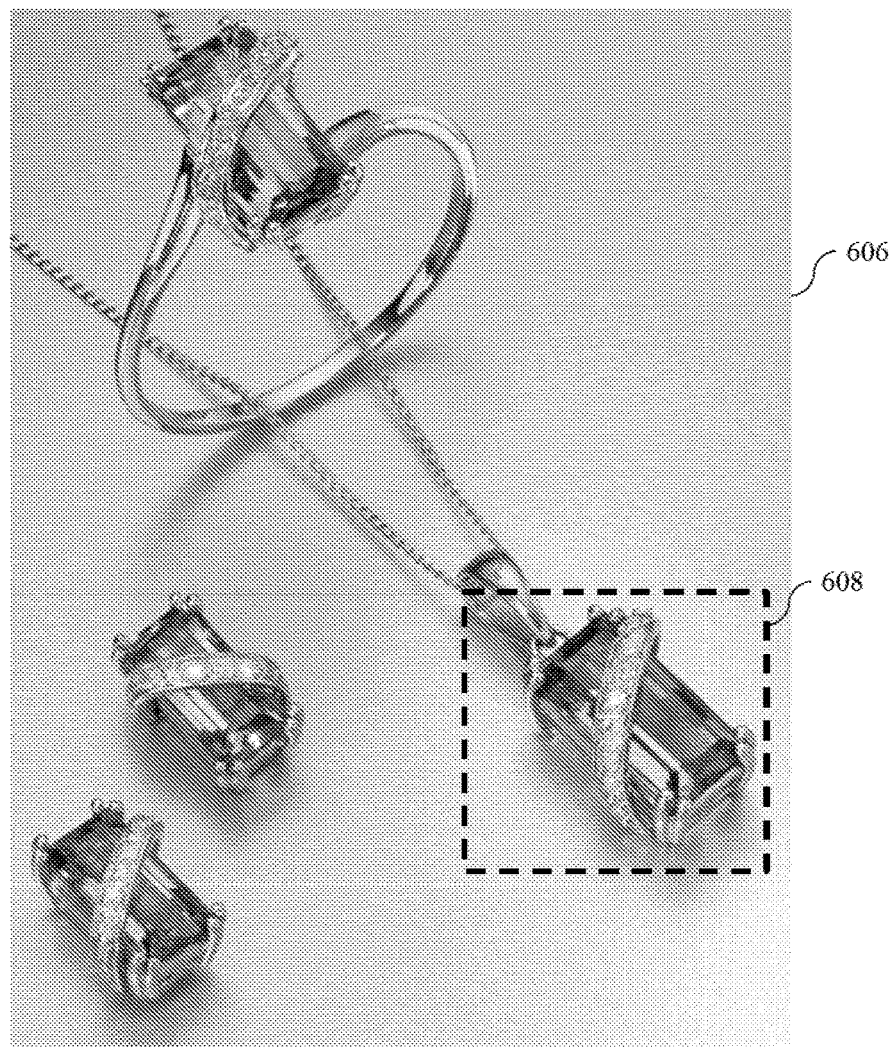
Figure 6C:
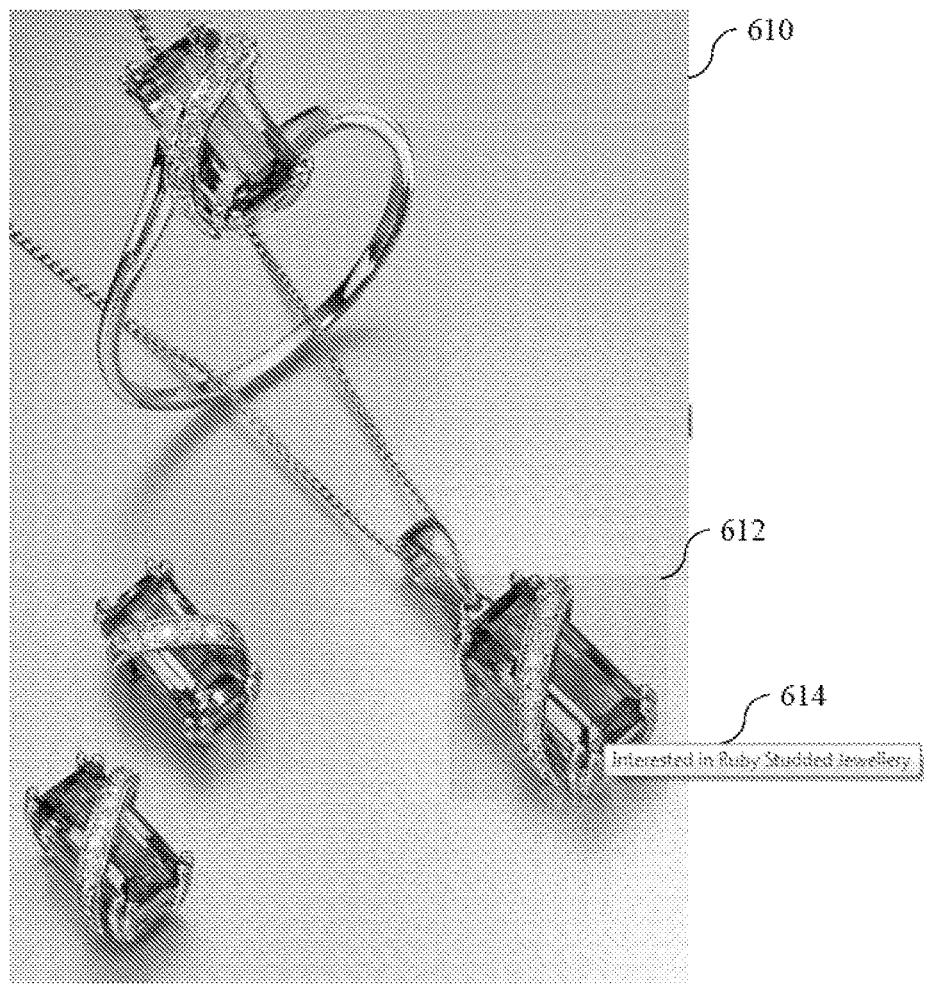

FIG. 6A, FIG. 6B, and FIG. 6C are diagrams illustrating engaging experience of a user, according to one or more embodiments.

In illustrated example, the user visits a website "XYZ" (602). The user then clicks on a video thumbnail 604 to watch corresponding video. The user pauses the video while currently playing frame 606 is being played. The pausing by the user is detected as a trigger indicative of interruption of the currently playing frame 606. Attention-activity of the user is then determined. In illustrated example, the user hovers mouse over a portion 608 of the currently playing frame 606. In response to determining the attention-activity, an interactive version 610 of the currently playing frame is generated and the currently playing frame 606 is replaced with the interactive version 610. The interactive version 610 replaces the portion 608 with a clickable spot 612. In illustrated example, the clickable spot 612 (call to action button) is included within the interactive version, i.e. within the currently playing frame, and not as an overlay or not outside (the window of) the currently playing frame. Optionally, a message 614 is also displayed against the clickable spot 612. The user then clicks on the clickable spot 612 to obtain more information on the portion, thereby enhancing the engaging experience of the user.

The embodiments of the present invention may be embodied as procedures, apparatus, electronic devices, and/or computer program products. Accordingly, the embodiments of the present invention may be embodied in hardware and/or in software (including firmware, resident software, micro-code, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution apparatus. In the context of this document, a computer-usable or computer-readable medium may be any medium that can contain, store, communicate, propagate, or transport the program for use by or in connection with the instruction execution apparatus, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

Examples of the computer-usable or computer-readable medium include, but are not limited to, an electronic, magnetic, optical, electromagnetic, infrared, or semiconductor apparatus, apparatus, device, or propagation medium. More specific examples (a non-exhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like or in scripting language, such as Perl, Python, PHP, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

The procedures described herein may be implemented in software, hardware, or a combination thereof, in different embodiments. In addition, the order of procedures may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance.

In the foregoing detailed description, numerous specific details are set forth to provide a thorough understanding of claimed subject matter. However, it will be understood by those skilled in the art that claimed subject matter may be practiced without these specific details. For example, the claimed subject matter may be practiced by using different gestures or icons than that described. In other instances, procedures or apparatuses that would be known by one of ordinary skill have not been described in detail so as not to obscure claimed subject matter.

Some portions of the detailed description are presented in terms of algorithms or symbolic representations of operations on binary digital signals stored within a memory of a specific apparatus or specific electronic device or special purpose computing device or platform. In the context of this particular specification, the term specific apparatus or the like includes a general-purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Unless specifically stated otherwise, as apparent from the following discussion, it is appreciated that throughout this specification discussions utilizing terms such as "processing," "displaying," "receiving," "providing" or the like refer to actions or processes of a specific apparatus, such as a special purpose computer or a similar special purpose electronic device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic device.

Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

What is claimed is:

1. A method of generating interactive digital frames to provide an engaging experience when viewing digital assets comprising:
    tracking at least one of:
        a number of times a frame of a digital asset is paused by a plurality of users; or
        an attention-activity of the plurality of users for the frame;
    generating, by at least one processor, an interactive version of the frame based on at least one of:
        the number of times the frame is paused; or
        the attention-activity of the plurality of users for the frame; and
    playing the interactive version of the frame.

2. The method as recited in claim 1, wherein:
    the method comprises tracking the attention-activity of the plurality of users for the frame; and
    tracking the attention-activity of the plurality of users for the frame comprises at least one of:
        varying zoom level of the frame, panning to a portion of the frame, gazing at a portion of the frame, clicking a portion of the frame, hovering over a portion of the frame, or engaging with a portion of the frame.

3. The method as recited in claim 2, wherein generating, by the at least one processor, the interactive version of the frame comprises adding a clickable spot within the frame based on the attention-activity of the plurality of users for the frame.

4. The method as recited in claim 1, further comprising:
    receiving an indication of pausing of the digital asset; and
    wherein playing the interactive version of the frame is in response to receiving the indication of the pausing of the digital asset.

5. The method as recited in claim 1, wherein:
    the method comprises tracking the number of times the frame of the digital asset is paused by the plurality of users; and
    generating, by the at least one processor, the interactive version of the frame is based on the number of times the frame is paused.

6. The method as recited in claim 1, further comprising calculating a score for the frame based on the number of times the frame is paused and the attention-activity of the plurality of users for the frame.

7. The method as recited in claim 6, further comprising:
    determining that the score for the frame is greater than a predefined threshold; and
    generating, by the at least one processor, the interactive version of the frame based on the score for the frame being greater than the predefined threshold.

8. A non-transitory computer readable medium storing instructions thereon that, when executed by at least one processor, cause a computing device to:
    detect that a video is paused;
    identify a frame of the video that is displayed while the video is paused;
    determine, based on monitored activity of one or more users, at least a portion of the frame that is attention drawing; and
    replace the identified frame of the video with an interactive version of the frame generated based on the determined at least a portion of the frame that is attention drawing.

9. The non-transitory computer readable medium as recited in claim 8, further comprising instructions that, when executed by the at least one processor, cause the computing device to generate the interactive version of the frame by adding a message to the frame.

10. The non-transitory computer readable medium as recited in claim 9, wherein the instructions, when executed by the at least one processor, cause the computing device to generate the interactive version of the frame further by embedding a link in the frame in connection with the message.

11. The non-transitory computer readable medium as recited in claim 10, further comprising instructions that, when executed by the at least one processor, cause the computing device to:
    detect a click on the interactive version of the frame; and
    provide additional information on a feature in the at least a portion of the frame that is attention drawing.

12. The non-transitory computer readable medium as recited in claim 11, wherein the additional information comprises opening a website related to the feature.

13. The non-transitory computer readable medium as recited in claim 9, wherein the instructions, when executed by the at least one processor, cause the computing device to generate the interactive version of the frame automatically without user input.

14. The non-transitory computer readable medium as recited in claim 9, further comprising instructions that, when executed by the at least one processor, cause the computing device to:
    search for a tag in metadata of the frame; and
    identify that the frame is to be replaced with the interactive version of the frame based on a determination that the tag is in the metadata of the frame.

15. A system for generating interactive digital frames to provide an engaging experience when viewing digital assets comprising:
    at least one server; and
    at least one non-transitory computer readable storage medium storing instructions that, when executed by the at least one server cause the system to:
        track attention activities of users relative to frames of a digital asset;
        provide, within an editing interface, a frame of the digital asset with which the users performed one or more of the attention activities;

detect user input, via the editing interface, requesting addition of a hotspot, a hyperlink, a call to action, or an annotation to the frame; and generate an interactive version of the frame based on the detected user input that includes the hotspot, the hyperlink, the call to action, or the annotation.

16. The system as recited in claim 15, wherein the instructions, when executed by the at least one server, further cause the system to:

detect a trigger relative to the frame of the digital asset as the digital asset is being played; and replace the frame of the digital asset with the interactive version of the frame based on the detected trigger relative to the frame.

17. The system as recited in claim 16, wherein the trigger relative to the frame is a pausing of the digital asset on the frame.

18. The system as recited in claim 15, wherein the instructions, when executed by the at least one server, further cause the system to:

calculate a score for the frame based on the tracked attention activities of users relative to the frame;

determine that the score for the frame is greater than a predefined threshold; and provide, within the editing interface, the frame based on the score for the frame being greater than the predefined threshold.

19. The system as recited in claim 15, wherein the instructions, when executed by the at least one server, further cause the system to track attention activities of users relative to frames of the digital asset by performing steps comprising: tracking varying of zoom level of the frames, tracking panning to portions of the frames, tracking gazing of users at portions of the frames, tracking clicking on portions of the frames, tracking hovering over portions of the frames, or tracking pausing of the frames.

20. The system as recited in claim 15, wherein the instructions, when executed by the at least one server, further cause the system to expose editing tools that allow the user to add interactivity to the frame.

* * * * *